United States Patent [19]

Stein et al.

[11] Patent Number: 5,896,495
[45] Date of Patent: Apr. 20, 1999

[54] METHOD AND SYSTEM FOR SYNCHRONIZING THE EXECUTION OF EVENTS

[75] Inventors: Douglas R. Stein, Santa Clara; Van A. Boughner, San Jose, both of Calif.

[73] Assignee: Sun Microsystems, Inc., Palo Alto, Calif.

[21] Appl. No.: 08/893,740

[22] Filed: Jul. 11, 1997

Related U.S. Application Data

[63] Continuation of application No. 08/499,263, Jul. 7, 1995, abandoned.

[51] Int. Cl.$^6$ .................................................. G06F 9/44
[52] U.S. Cl. .......................... 395/183.14; 395/185.04; 395/551
[58] Field of Search ..................... 395/183.14, 183.15, 395/182.1, 185.04, 551, 553, 557, 682; 364/221.7, 266.1, 269, 270.5, 271, 275.5

[56] References Cited

U.S. PATENT DOCUMENTS

| | | | |
|---|---|---|---|
| 4,276,594 | 6/1981 | Morley | 364/200 |
| 4,316,245 | 2/1982 | Luu et al. | 364/200 |
| 4,374,409 | 2/1983 | Bienvenu et al. | 364/200 |
| 4,394,725 | 7/1983 | Bienvenu et al. | 364/200 |
| 5,276,828 | 1/1994 | Dion | 395/425 |
| 5,301,308 | 4/1994 | Daar et al. | 395/182.1 |
| 5,335,342 | 8/1994 | Pope et al. | 395/183.14 |
| 5,361,369 | 11/1994 | Kametani | 395/800 |

FOREIGN PATENT DOCUMENTS 2242291  9/1991  United Kingdom.

OTHER PUBLICATIONS

Yongseok Park & Chong E.K.P. Distributed Inversion in Timed Discrete Event Systems; Journal Paper; Discrete Event Dynamic System: Theorys Applications, vol. 5; No. 2-3; pp. 219-241, Apr.-Jul. 1995.

"Input Simulation Tools", Van A. Boughner, Feb. 1994, 52 Pages, SunSoft, Part No. 801-7261-01, Revision 1.2.

*Primary Examiner*—Dieu-Minh Le
*Attorney, Agent, or Firm*—Patrick J. S. Inouye

[57] ABSTRACT

An embodiment of the present invention provides an improved method and system for synchronizing the execution of two or more events used to test a software product. The improved method begins by invoking a driver to assist in the generation of a first event. The driver program sends over a first message which instructs the client to initiate generation of the first event. After the first event has been generated, the client stores the first event in a first buffer. Next, the client processes the first event. In the course of processing the first event, other events may have been generated and stored in the first buffer. Therefore, the client examines the first buffer to determine if events spawned while processing the first event await processing. If new events are stored in the first buffer, then the client processes the new events. This process continues until the examination determines that the first buffer does not store events. After all events have completed processing, the client sends an acknowledgment to the driver. The acknowledgment indicates that the driver may send over a second message for processing by the client.

25 Claims, 14 Drawing Sheets

METHOD AND SYSTEM FOR SYNCHRONIZING THE EXECUTION OF EVENTS

This is a continuation of application Ser. No. 08/499,263, filed Jul. 7, 1995, now abandoned.

FIELD OF THE INVENTION

The present invention relates generally to a computer method and system for synchronizing the execution of events, and, more specifically, for synchronizing events used to test a software product.

BACKGROUND OF THE INVENTION

One aspect of the field of software testing focuses on the testing of graphical user interface programs (GUI programs). A GUI program is a program that provides functionality which is not accessible from a command line but is accessible through the program's graphical user interface. Typically, GUI program testing takes place during a product development cycle of a new program. GUI program testing may also take place during the development of a new version of an existing GUI program.

Due to the inadequacies of manual testing techniques, automated testing techniques have been developed. FIG. 1 illustrates a computer system 100 for testing a GUI program 101 using automated testing techniques found in the prior art. The computer system 100 includes a display device 103, a storage device 105, an input device 107, and a computer 109. The computer includes an interface 111, a processor 113, and a computer memory 115, which stores the GUI program 101. The GUI program includes a GUI component 119 and an engine component 121. The GUI component updates and retrieves information from a frame buffer associated with a GUI 117. In short, the GUI component has program code to control changes to the GUI. The code may be generated automatically from GUI builders. Engine code is code that implements the program's functionality. For example, engine code generates the information to be displayed on the GUI.

Prior art automated testing methods simulate input events (such as mouse clicks) in order to test the same data processing paths that are invoked in response to user input. In this way all functionality in a GUI program is tested through the program's GUI component. The prior art methods begin the testing process by having a user enter data through a GUI 117 using the input device 107. For example, the inputs may indicate that a "ButtonPress" event should be processed. The method records the user inputs and saves them to a separate file. The recorded inputs are later replayed as a test script 123. A test script engine 124 drives the replay of the test script 123. In response to the inputs, the GUI 117 changes its state. For example, if the inputs indicate that a "ButtonPress" operation should be invoked, then the method performs the steps associated with the ButtonPress event. In response to the changes in the GUI the method saves the new GUI state as a bitmap in a raster file (also called saving a "snapshot" of the GUI). The bitmap may also be saved in any other type of image format. In addition to or in place of taking a snapshot the method may perform resource verification for the widgets displayed on the GUI.

The snapshot acts as a baseline for comparing the program's response to user inputs at an earlier point in the development process with the program's response to the same user input at a later point in the development process. For example, as the development process continues, changes are made to the program code underlying the GUI component 119 and the engine component 121. In order to test the changes using automated techniques, the prior art method replays the input events recorded earlier. In response to replaying the input events, the GUI component 119 invokes the engine component 121 which in turn instructs the GUI component to redraw the GUI. In this way the engine component 121 is invoked through the GUI component 119. The method then takes a snapshot of the changes to the GUI 117. Finally, the earlier snapshot is compared to the later snapshot. If the snapshots are identical then the method concludes that the changes made to the program work properly. Non-identical snapshots may indicate that a bug has been introduced into the program.

One of the problems associated with automated testing techniques involves properly synchronizing the replay of the input events. Problems arise because there is often an interdependence between the input events. For example, assume a first input event displays a menu on the GUI and a second input event selects an entry on the menu. For the second event to work properly, the menu must be displayed before the second input event is executed. If the computer tries to select an entry on a menu that is not displayed, the system will return an error.

In the past some system developers have tried to address the synchronization problem by inserting delays into their test scripts. Continuing with the example above, these developers would insert a delay command between the first and second input events in the hopes that the delay would be long enough to ensure that the "menu selection event" would be executed after the system had completed displaying the menu.

Inserting delay commands into test scripts often fails to solve the synchronization problem because the total amount of time it takes a given event to execute on a particular computer varies each time the computer executes the event. For at least this reason time delays are inadequate to ensure proper synchronization between events.

The variation in the amount of time it takes a given event to finish executing becomes even more pronounced when the comparison is made between events executing on different systems. Such a case arises when a test script is used to test a port of a particular software product. For example, if a software developer ports an operating system from a platform with a faster microprocessor to a platform with a slower microprocessor then the time delay originally inserted into the test script may not be sufficient to ensure proper synchronization. For at least this additional reason, time delays are inadequate to ensure proper synchronization.

Furthermore, benchmarking the performance of a software product is impossible if time delays are introduced into the test script. Benchmarking involves running a software product through a series of tests and measuring the performance of the software product during the tests. Obviously, if time delays are introduced into the test script, the measurements from a benchmark become meaningless. For at least this additional reason time delays are undesirable.

Introducing time delays poses a general problem, which is that they slow the test execution process down. This problem becomes more pronounced when using large test suites.

It would be beneficial to develop an improved method and system for ensuring proper synchronization between test events.

SUMMARY OF THE INVENTION

An embodiment of the present invention provides an improved method and system for synchronizing the execution of two or more events used to test a software product. The improved method begins by invoking a driver to assist in the generation of a first event. The driver program sends over a first message which instructs the client to initiate generation of the first event. After the first event has been generated, the client stores the first event in a first queue. Next, the client processes the first event. In the course of processing the first event, other events may have been generated and stored in the first queue. Therefore, the client examines the first queue to determine if events spawned while processing the first event await processing. If new events are stored in the first queue, then the client processes the new events. This process continues until the examination determines that the first queue does not store events. After all events have completed processing, the client sends an acknowledgment to the driver. The acknowledgment indicates that the driver may send over a second message for processing by the client.

NOTATIONS AND NOMENCLATURE

Figure 1:
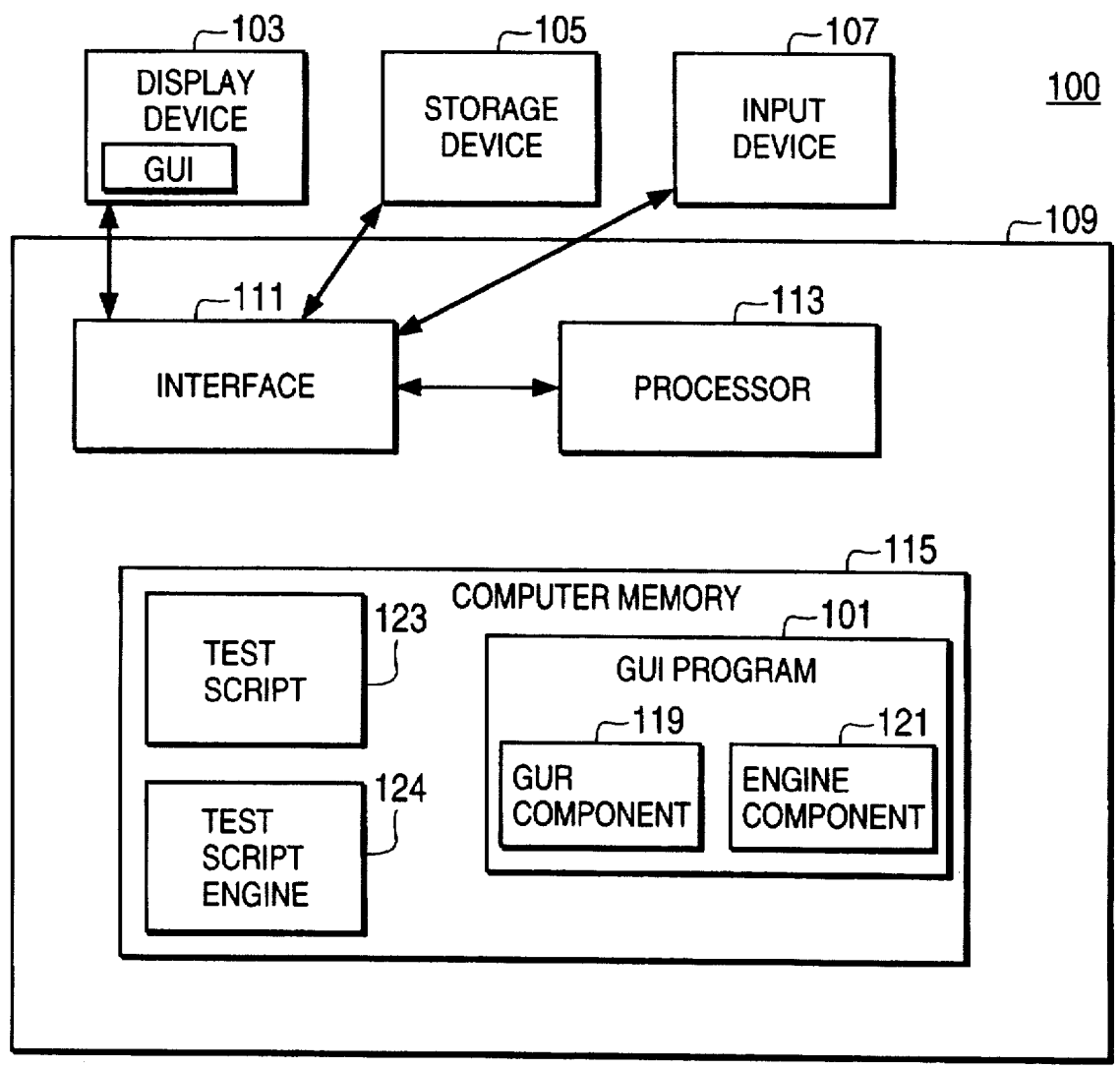
FIG. 1 illustrates a computer system for testing a GUI program using automated testing techniques found in the prior art.

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

DETAILED DESCRIPTION

Overview of the Preferred Methods

The embodiments of the present invention described below provide an improved method and system for synchronizing the execution of two or more events used to test a software product. One embodiment begins by invoking a driver to assist in the generation of a first event. The driver program sends over a message which instructs the client to initiate generation of the first event. After the first event has been generated, the client stores the first event in a first queue. Next, the client processes the first event. In the course of processing the first event, new events may have been generated and stored in the first queue. Therefore, the client examines the first queue to determine if new events were spawned while processing the first event. If new events are stored in the first queue, then the client processes the new events. This process continues until the examination determines that the first queue does not store new events. After the events have completed processing, the client then proceeds to send an acknowledgment to the driver. The acknowledgment indicates that the driver may send over a new message for processing by the client.

The embodiments of the present invention described below concern an implementation that is adapted for use in a software testing environment. Nevertheless those of ordinary skill in the art will appreciate that the present invention may also be implemented in other environments wherein events require synchronization.

Overview of the Preferred System

Figure 2:
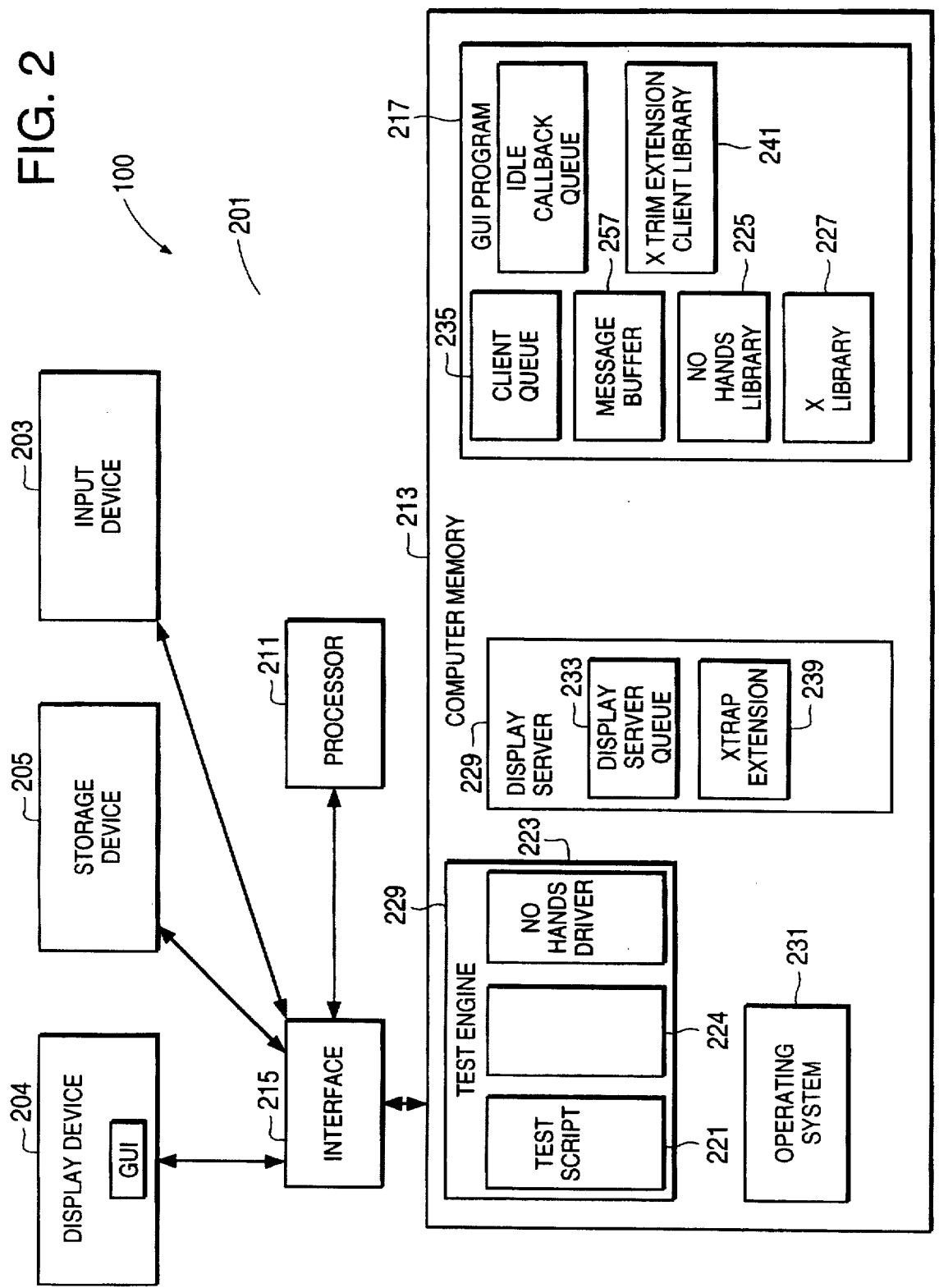
FIG. 2 is a block diagram of a computer system for practicing the various embodiments of the present invention.

FIG. 2 is a block diagram of a computer system 200 for practicing the various embodiments of the present invention. The computer system 200 includes a computer 201, an input device 203, a storage device 205, and a display device 207. The display device 207 displays a graphical user interface (GUI) 209. A frame buffer (not shown) provides a memory for storing data to be displayed on the GUI 209. The GUI presents information through icons, and a user invokes commands by pointing to or manipulating the icons. The computer 201 includes a processor 211, a memory 213, and an interface 215 for enabling communication between the processor 211 and peripheral devices such as the input device 203 and the display device 207.

The computer memory includes a number of items including a GUI program (or "client") 217 and a test engine 219. The test engine 219 includes a test script 221, a No Hands driver 223, and an interpreter 224. The GUI program 217 and the test engine 219 are preferably implemented as distinct processes. The test script 221 includes a series of commands to invoke routines that simulate user action on the GUI 209. The simulated action is used to test the GUI program 217. Test scripts can be manually developed from design specifications of the GUI component and the engine component while both components are under development. The test scripts can also be created automatically through use of a computer program developed for that purpose.

The test script commands are retrieved from the test script and sent to the GUI program 217 as a message via a driver 223. The driver 223 is preferably implemented using the No Hands software product from SunSoft, a division of Sun Microsystems, Inc.[1] such as described in V. Boughner and D. Stein, "No Hands," Sun Microsystems, Inc., 1993, the disclosure of which is incorporated herein by reference. The No Hands driver is preferably included in the process space of the test engine 219. The No Hands driver communicates with the test script engine and the GUI program through any well-known interprocess communication mechanism (not shown). The No Hands driver 223 retrieves a command from the test script 221 and sends a corresponding message to a No Hands library 225 over the interprocess communication (IPC) mechanism. The No Hands driver preferably blocks until it receives an acknowledgment from the GUI program 217 that the GUI program is ready to process a new message.

1.Sun, SunSoft, and Sun Microsystems are trademarks or registered trademarks of Sun Microsystems, Inc. in the United States and other countries.

The No Hands library 225 carries out the message by initiating the creation of an event which simulates user action on the GUI 209. For example, the event could simulate a user's "double-click" on a button to display a new menu.

Before discussing how simulated events are processed by the various embodiments of the present invention, it may be helpful to first explain how actual events are processed by a typical windowing system. The X Window System™ is the preferred windowing system of the present invention for managing input and output on a GUI. The X Window System is a combination of an X protocol, an X display server, X clients, and Xlib routines. X clients are applications, such as the GUI program 217, which use a computer's display device. The X client formats its requests using the X protocol and sends the requests to the X display server (e.g., display server 229). The X display server is a process which manages outputs to the frame buffer and inputs from the keyboard and mouse. The X display server considers anything from the keyboard and mouse as events to be reported to the clients. For example, when a user presses and releases a mouse button in a window on the GUI, the X server sends these input events to the X client application associated with that window. The X client examines the input event and determines what action to take. Typically, a series of "callbacks" are associated with each event. Therefore, in response to receiving an event, the X client invokes the appropriate "callbacks" into the X library routines to perform the appropriate action. Callbacks are not limited to calls into an X Windows library but can perform other steps as well. The X library routines send requests to the X display server which, in turn, updates the GUI. More detailed information on the X Window System can be found in *X Window System Programming*, by Naba Barkakati, which is incorporated herein by reference.

The embodiments of the present invention simulate user input using test script commands in order to automate the testing process. Therefore, the embodiments of the present invention do not typically receive actual user input. To create a simulated event the No Hands library 225 makes a call (or a series of calls) into a library 241. In the preferred embodiment, the library 241 is implemented using the XTrap extensions client library for the X Window System.

The XTrap extensions client library then calls a display server 229 which actually updates the GUI 209 in accordance with the methods from the library.

In addition to initiating creation of the simulated event, the No Hands library routines also track the processing of the event in order to determine when processing of the event is complete. When the tracking indicates that the processing of the event is complete, the No Hands library routine sends an acknowledgment back to the No Hands driver 223 indicating that the No Hands library 225 is ready to process a new message from the No Hands driver.

Flow Diagrams

FIGS. 3–13 are flow diagrams which illustrate different embodiments for practicing the present invention. Before processing begins in FIGS. 3–13, the system 200 is first brought to the point where all processes are up and running and connected through interprocess communication mechanisms. Once connected the processes are invoked in order to inject a simulated event into a display server queue 233.

Figure 3:
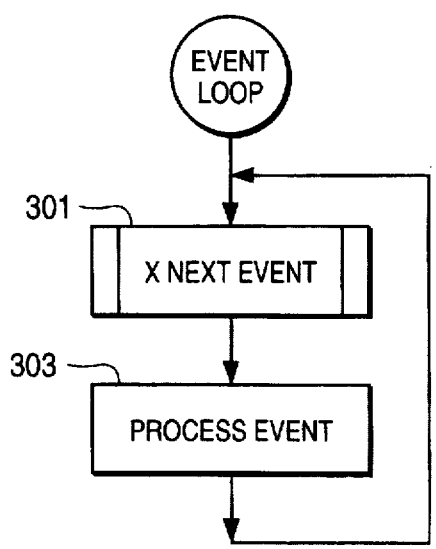
FIG. 3 is a flow diagram that provides an overview of the processing that takes place in the GUI program during program testing.

FIG. 3 illustrates an event loop used by the GUI program 217 to process the simulated event. The event loop retrieves the simulated event from the display server queue 233, processes the retrieved event, and tracks the processing of the event to determine when processing is complete. When processing is complete, the event loop sends an acknowledgment to the No Hands driver indicating that the GUI program is ready to process another message from the No Hands driver. In this way event simulation is properly synchronized.

Within the X Windows System, the event loop uses the XNextEvent routine to retrieve events from the display server. XNextEvent then checks the window identification and event type information sent along with the event and decides what to do based on this information. The event loop is typically broken when a variable changes its value from zero to non-zero. One of the events, for example the Quit event, sets this variable to a non-zero value. The creation of an XIOError could also cause an exit out of the event loop.

The XNextEvent routine which comes with the X Windows System does not contain code to track the processing of an event or to send an acknowledgment to the No Hands driver when processing of the event is complete. In order to insert such code into the event loop processing, the developers of the present invention created their own version of the XNextEvent routine which preferably contains the same functionality as the XNextEvent routine but, in addition, also contains code to track the status of event processing and to send an acknowledgment to the No Hands driver. In fact, the developers of the present invention have developed three separate embodiments of the XNextEvent routine. The XNextEvent routine of the present invention is preferably stored in the No Hands library 225.

To ensure that the XNextEvent routine in the No Hands library 225 is executed before or in place of the XNextEvent routine in the X library 227, the developers of the present invention interpose their version of XNextEvent in front of the X Window's version of XNextEvent. In the Solaris operating system this interposition is performed using the LD_PRELOAD environment variable. The LD_PRELOAD environment variable contains a list of shared objects that are to be interpreted by the dynamic linker at run time. The specified shared objects are linked in after the program being executed (e.g., the GUI program 217) and before shared objects that the program references (e.g., the X library 227). In this way when the GUI program 217 initiates its event loop and makes a call to the operating system 231 to invoke the XNextEvent routine, the operating system 231 will invoke the version of XNextEvent stored in the No Hands library 225. In the preferred embodiment the system uses the Solaris[1] operating system from Sun Microsystems. Those of ordinary skill in the art will understand that operating systems other than Solaris can be used and that methods other than LD_PRELOAD will then be invoked to interpose methods used to implement the system's event loop. Those of ordinary skill will also understand that windowing systems other than X Windows can be used.

1.Solaris is a trademark or registered trademark of Sun Microsystems, Inc. in the United States and other countries.1

A First Embodiment Of XNextEvent

Figure 4:
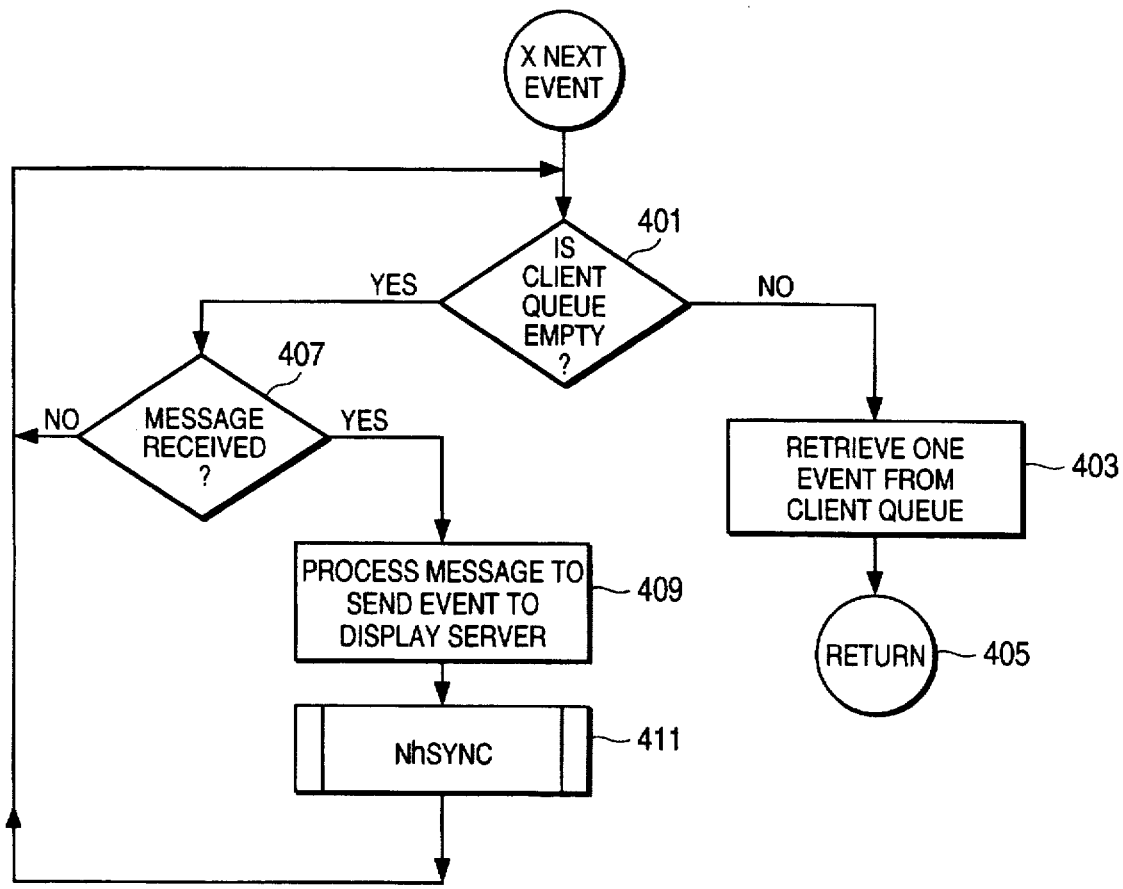
FIG. 4 is a flow diagram of a first embodiment of the XNextEvent routine.

FIG. 4 is a flow diagram of a first embodiment of the XNextEvent routine of the present invention. In step 401, the routine examines a client queue 235 to determine if the client queue currently stores any events awaiting processing. If the client queue does store events then the routine retrieves the next event from the client queue (step 403). In step 405 XNextEvent returns to step 303 in the event loop, where the event is processed.

If the client queue does not currently store events then in step 407 the routine checks a message buffer 237 to determine whether any messages have been received from the No Hands driver 223. If no messages have been received then processing in the routine loops back to step 401. However, if the routine has received a message from the No Hands driver then, in step 409, XNextEvent processes the message. The message initiates processing in the system 200 which injects a simulated event into the display server queue 233. In the preferred embodiment this is done by sending a request to the display server 229 to generate an event. Event generation in the display server is preferably accomplished with routines stored in an XTrap extension 239 of the display server 229 and an XTrap extension client library 241 of the GUI program 217. Thus the Xtrap extensions should be installed in the system 200 before input simulation is attempted. Those of ordinary skill will understand that other window systems will have similar mechanisms for accomplishing the injection of an event into the system. After the event has been injected into the display server queue, XNextEvent calls a NhSync routine (step 411). Upon return from NhSync, processing continues in XNextEvent in step 401.

Figure 5:
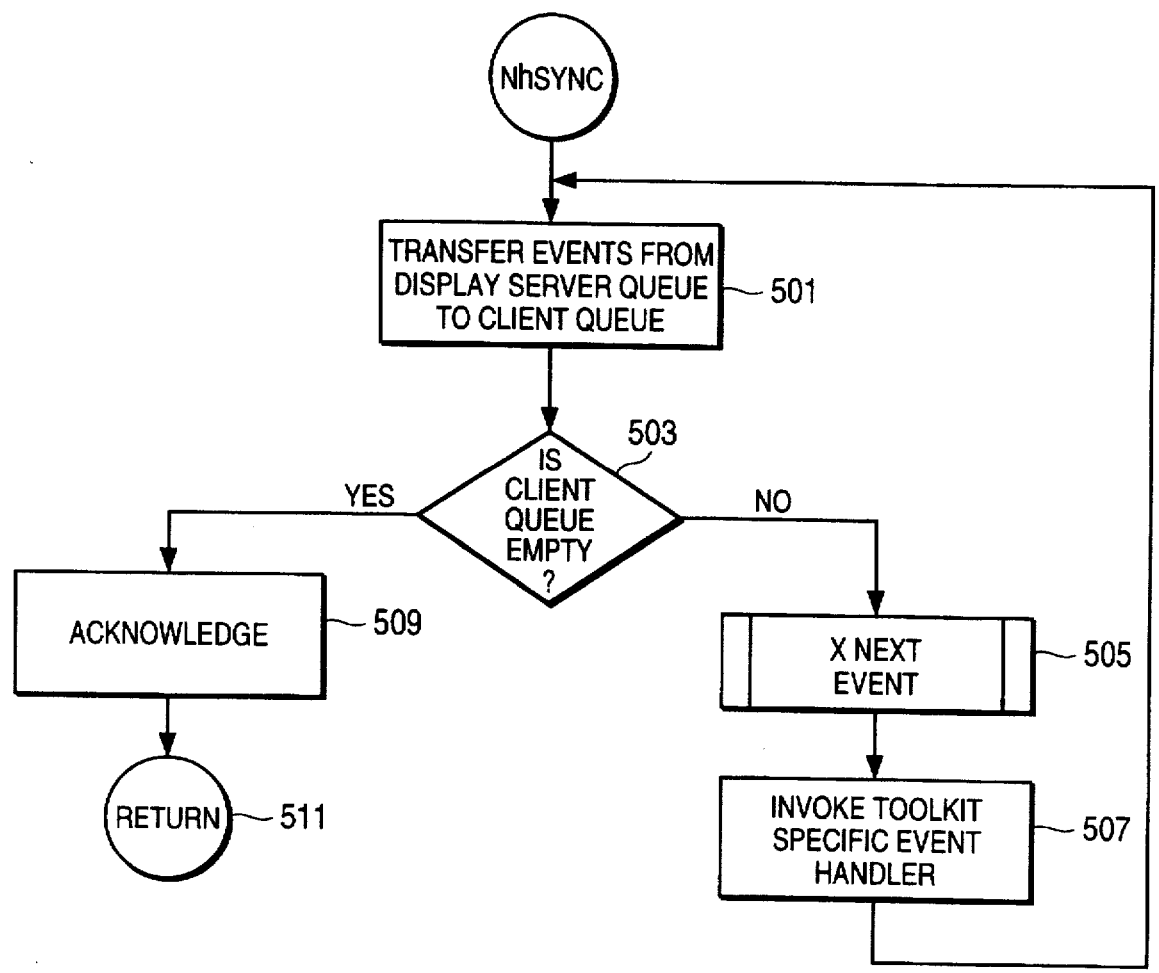
FIG. 5 is a flow diagram of the NhSync routine.

FIG. 5 is a flow diagram of the NhSync routine. In step 501 NhSync transfers events from the display server queue 233 to the client queue 235. In the preferred embodiment the XSync routine from the X library is used to transfer events from the display server queue 233 to the client queue 235. In step 503 NhSync examines the client queue 235 to determine whether the client queue is empty. If the client queue is not empty then in step 505, a recursive call is made to the XNextEvent routine.

In response to the recursive call to XNextEvent, processing continues in XNextEvent at step 401. In step 401, the XNextEvent routine examines a client queue 235 to determine if the client queue currently stores any events awaiting processing. If the client queue does store events then the XNextEvent routine retrieves the next event from the client queue (step 403). In step 405 XNextEvent returns to step 507 in NhSync where NhSync invokes an event handler routine from the X library 227. The event handler routine processes the event to perform the task the event was meant to accomplish. In this embodiment the XtDispatchEvent routine (or an equivalent routine for other GUI toolkits) is the preferred event handler routine. Upon return from the event handler routine, processing continues with step 501 of the NhSync routine. Steps 303 and 507 perform event processing steps. However, step 303 performs event processing within the XNextEvent routine while step 507 performs event processing only if processing breaks out of XNextEvent.

Returning to the discussion of step 503, if NhSync determines that the client queue is empty then NhSync, in step 509, sends an acknowledgment to the No Hands driver 223 indicating that the GUI program 217 is ready to process a new message from the No Hands driver. In step 511 processing ends in the NhSync routine.

A limitation of the first embodiment of XNextEvent is that it fails to accurately simulate some GUI program processing that occurs in response to actual user actions on the GUI 209. For example, in the first embodiment of XNextEvent the routine invokes a toolkit specific event handler in order to simulate actual processing of a retrieved event (see step 507 of FIG. 5). Invoking the toolkit specific event handler does not, however, accurately simulate processing that occurs in response to some user actions. In particular, some user actions are processed without ever invoking a toolkit specific event handler. Instead custom code is used to process the event. Since the first embodiment of XNextEvent invokes the toolkit specific event handler and does not invoke the custom code, the first embodiment does not accurately simulate all event processing.

A Second Embodiment Of XNextEvent

Figure 6:
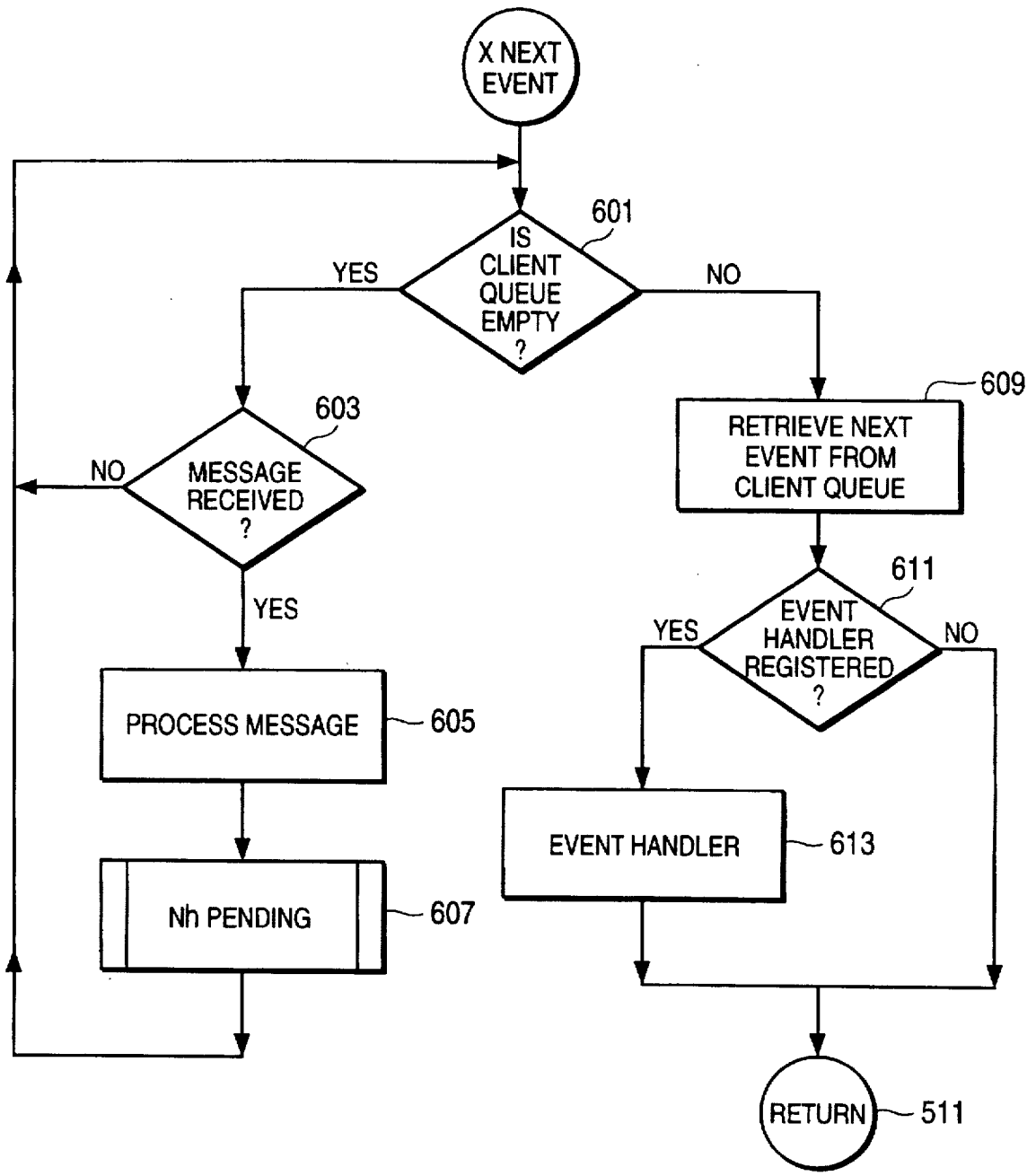
FIG. 6 is a flow diagram of a second embodiment of the XNextEvent routine.

FIG. 6 is a flow diagram of a second embodiment of the XNextEvent routine. In step 601, XNextEvent examines the client queue 235 to determine whether it currently stores an event awaiting processing. If the client queue is empty (as may well be the case the first time through this routine) then in step 603, XNextEvent checks the message buffer 237 to determine whether a message has been received from the No Hands driver 223. If no messages have been received then processing loops back to step 601 to again check whether an event is waiting in the client queue.

Processing Messages From No Hands

Figure 7:
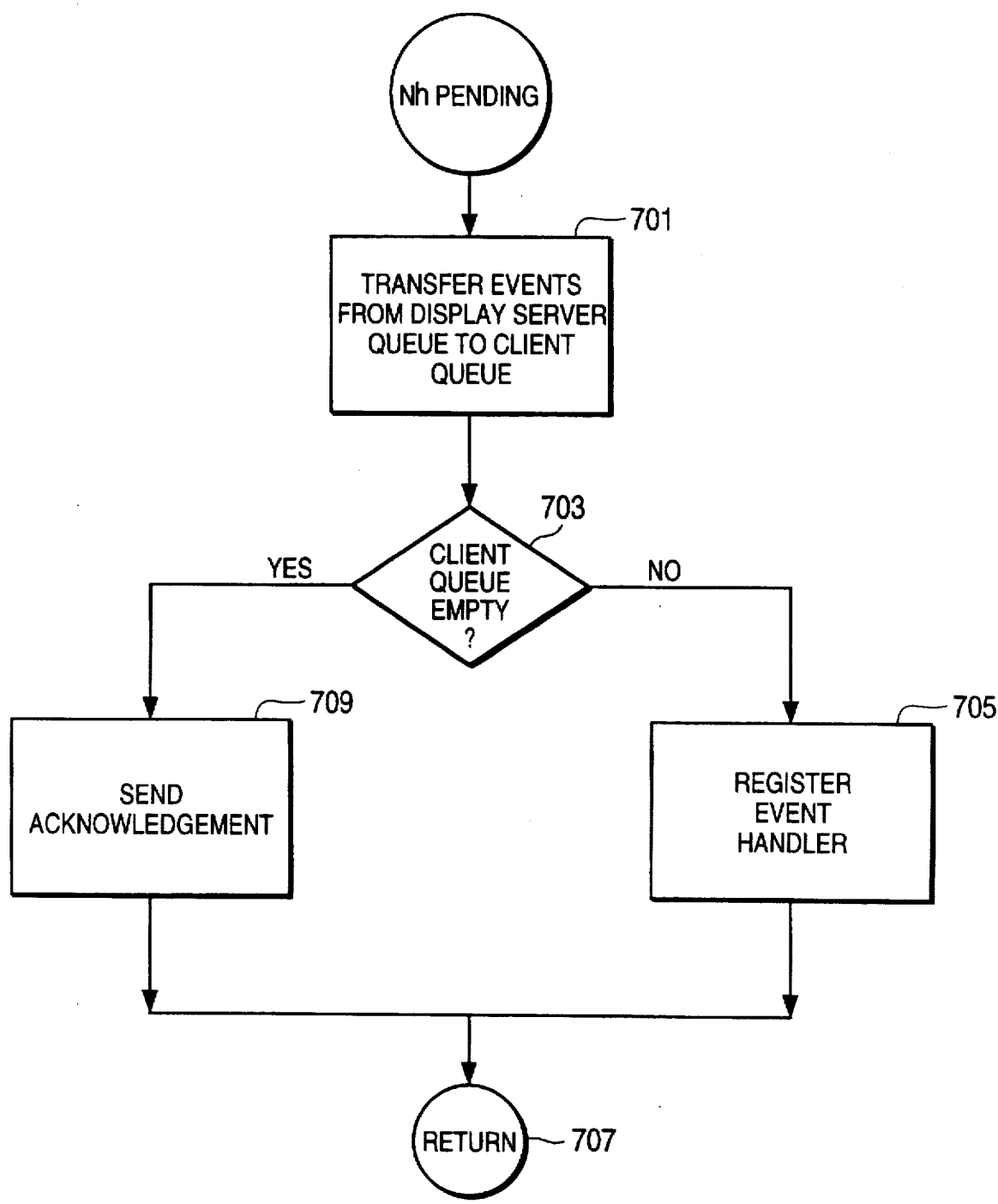
FIG. 7 is a flow diagram of a first embodiment of the NhPending routine.

However, if the routine has received a message from the No Hands driver then, in step 605, XNextEvent processes the message. The message may initiate processing in the system 200 to inject a simulated event into the display server queue 233 or it may initiate other types of processing. In the preferred embodiment the XTrap routine XESimulateXEventRequest is used when the No Hands driver intends to inject the simulated event into the display server queue. After the message has been processed, the routine calls an NhPending routine in step 607. If an event was not created then the NhPending routine sends an acknowledgment back to the No Hands driver. If an event was created then NhPending registers an event handling routine that tracks the processing of the event to determine the appropriate time to send an acknowledgment back to the No Hands driver. The NhPending routine is discussed in more detail below and is shown in FIG. 7.

Processing Events

After return from the NhPending call processing continues with step 601 of the XNextEvent routine. In step 601, if XNextEvent determines that the client queue 235 currently stores events awaiting processing (e.g., events created from execution of the No Hands message) then the next event in the client queue is retrieved in step 609. In step 611, XNextEvent determines whether an event handler is registered for the event retrieved from the client queue 235. Registration of event handlers is provided for by custom developed code which keeps a list of functions that should be invoked when an event is retrieved. When an event handler is registered for a selected event, the interposed XNextEvent routine calls the event handler each time the event occurs. Thus an event handler ensures that certain processing steps will take place in response to selected events in the system. If an event handler is registered for the event retrieved in step 609 then it is invoked in step 613. As is discussed in more detail below with respect to FIG. 8, the event handler used by the present embodiment examines the client queue to determine whether the system has retrieved the last event from the client queue. If the system has retrieved the last event from the client queue then the event handler sends an acknowledgment to the No Hands driver indicating that the GUI program is ready to process a new message from the No Hands driver. Upon return from the event handler, or if no event handler was registered in the first place, XNextEvent returns to the event loop of FIG. 3, where the retrieved event is executed by the process event routine.

The NhPending Routine

FIG. 7 is a flow diagram of the NhPending routine. The NhPending routine examines the client queue 235 to determine when it no longer stores events awaiting processing. Once the client queue is empty, it is an indication that XNextEvent has processed all events generated in response to the No Hands message. Once it is determined that all events have been processed, NhPending sends an acknowledgment to the No Hands driver indicating that the GUI program is ready to start processing a new message from the No Hands driver.

In step 701 NhPending transfers events from the display server queue 233 to the client queue 235. In step 703 NhPending examines whether the client queue 235 currently stores any events awaiting processing. If the client queue 235 is not empty then NhPending registers an event handler routine in step 705. After registering the event handler, NhPending returns to XNextEvent (step 707).

If NhPending determines that the client queue does not currently store events awaiting processing (step 703) then in step 709, NhPending sends an acknowledgment to the No Hands driver. The acknowledgment indicates that the GUI program is now ready to process a new message from the No Hands driver. Step 709 gets executed, for example, when execution of the No Hands message does not create an event in the system. After sending the acknowledgment, NhPending returns to XNextEvent (step 707).

The Event Handler Routine

Figure 8:
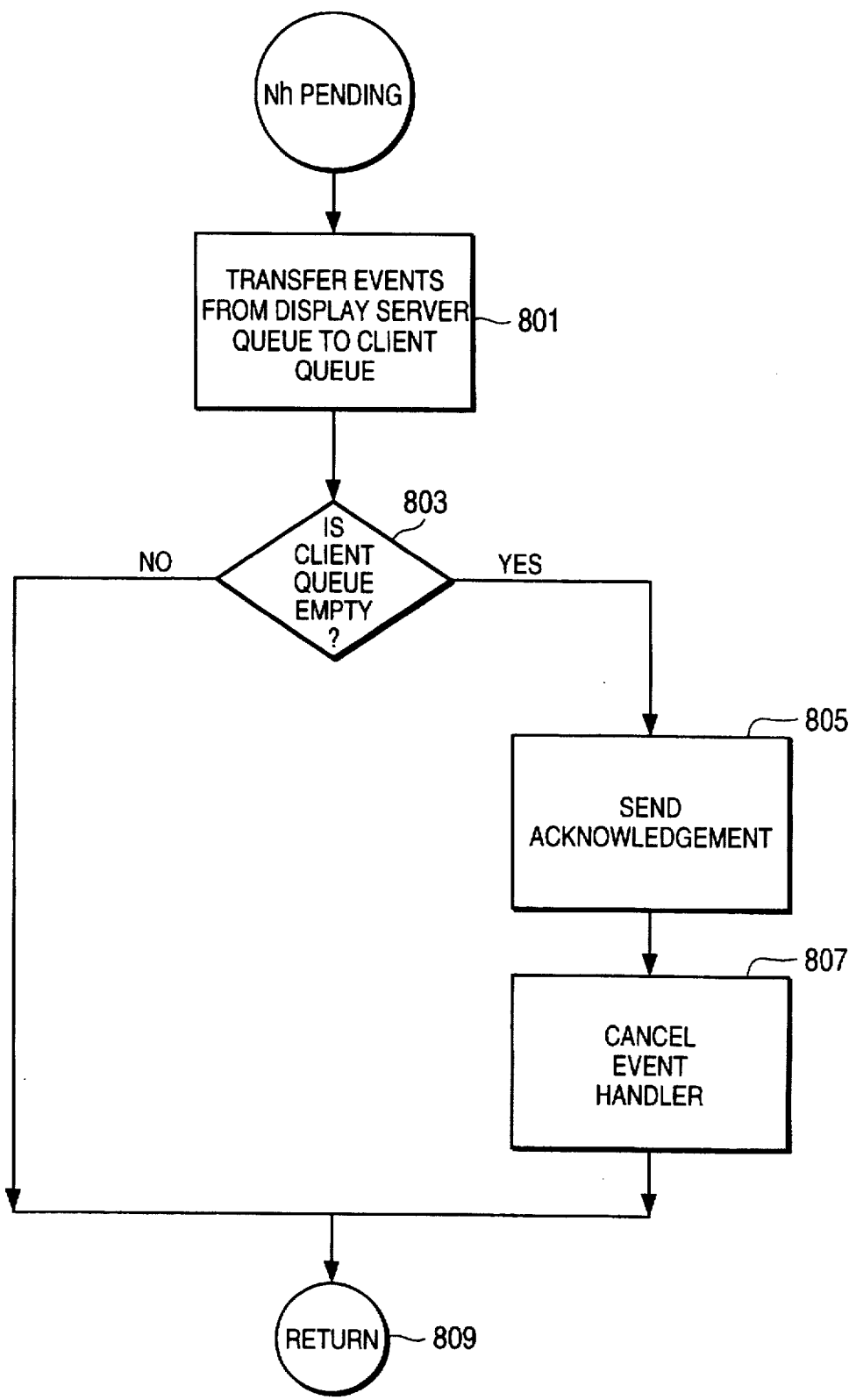
FIG. 8 is a flow diagram of a first embodiment of an event handler routine.

FIG. 8 is a flow diagram of a first embodiment of the event handler routine. In step 801, the event handler transfers events from the display server queue 233 to the client queue 235. In step 803, the event handler routine examines the client queue to determine whether any events awaiting processing are currently stored in the client queue. If the client queue is empty then an acknowledgment is sent to the No Hands driver 223 (step 805) and the event handler routine is cancelled (step 807). The acknowledgment indicates that the GUI program is now ready to process a new message from the No Hands driver. However, if the client queue currently stores events awaiting processing then the event handler routine returns, in step 809, to XNextEvent, and the events are processed when XNextEvent returns to the event loop of FIG. 3.

By invoking an event handler routine to examine the status of the client queue, events which are spawned while processing other events will be processed before sending an acknowledgment to the No Hands driver 223. For example, assume the message from the No Hands driver injects a button-press event into the display server queue. While processing the original button-press event, other events may be spawned and stored in the display server queue. For example, a map event, configure event, and expose event may be spawned and stored in the display server queue in order to display a dialog box in response to the original button-press event. In order to ensure proper synchronization between execution of messages from the No Hands driver, all events spawned while processing the original event must themselves be completely processed before the acknowledgment is sent to the No Hands driver. Invoking the event handler routine of the present invention ensures proper synchronization because the acknowledgment is only sent to the No Hands driver after all the pending events have been removed from the client queue.

A Third Embodiment Of XNextEvent

FIGS. 9–13 are flow diagrams which illustrate a third embodiment of the XNextEvent routine. The third embodiment essentially extends the second embodiment of the XNextEvent routine by processing work procs (also called idle callbacks) before sending an acknowledgment back to the No Hands driver 223. Idle callbacks are routines that are called whenever there are no events pending in the client queue 235. Idle callbacks allow developers to perform tasks in the background and to update the display.

In step 901, XNextEvent examines the client queue 235 to determine whether it currently stores an event awaiting processing. If the client queue is empty then in step 903, XNextEvent checks the message buffer 237 to determine whether a message has been received from the No Hands driver 223. If XNextEvent has received a message from the No Hands driver then, in step 905, XNextEvent processes the message. The message initiates processing in the system 200 which injects a simulated event into the display server queue 233 (step 907). In the preferred embodiment this is done by the XESimulateXEventRequest routine. After the event has been injected into the display server queue, XNextEvent calls a second embodiment of the NhPending routine in step 909.

Figure 10:
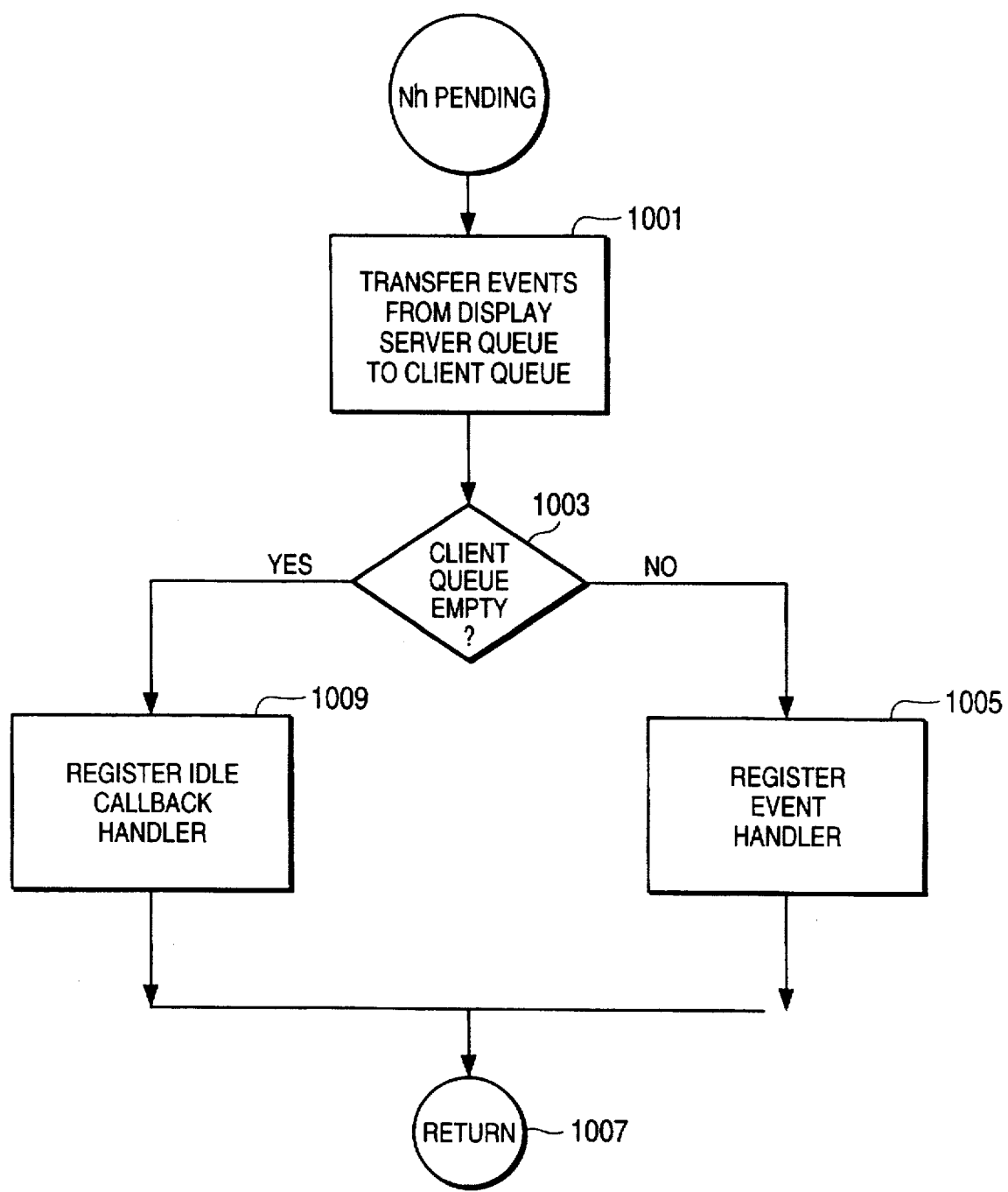
FIG. 10 is a flow diagram of a second embodiment of the NhPending routine.

FIG. 10 is a flow diagram of the second embodiment of the NhPending routine. The NhPending routine registers an event handler when events are currently stored in the client queue. The NhPending routine registers an idle callback handler when no events are currently stored in the client queue. In step 1001 NhPending transfers events from the display server queue 233 to the client queue 235. In step 1003 NhPending examines whether the client queue 235 currently stores an event awaiting processing. If the client queue 235 does store an event awaiting processing then NhPending registers an event handler routine in step 1005. When a developer registers an event handler for a selected event, the custom code calls the event handler each time the event is processed. The event handler mechanism checks the status of the processing of events in order to determine whether the GUI program 217 is ready to process a new message from the No Hands driver. After registering the event handler, NhPending returns to XNextEvent (step 1007).

Returning to the discussion of step 1003, if the client queue 235 does not currently store events awaiting processing, the NhPending routine registers an idle callback handler in step 1009. As will be described in more detail below, the idle callback handler determines whether idle callbacks which have previously been processed have created new events which must also be processed before an acknowledgment is sent to the No Hands driver 223. For example, if the idle callbacks have created events which require display updates then they should typically be processed before sending an acknowledgment back to the No Hands driver 223. After registering the idle callback handler, the NhPending routine returns to the XNextEvent routine (step 1007).

Returning to the discussion of the XNextEvent routine, processing continues with step 901 after return from the NhPending call. In step 901, if XNextEvent determines that the client queue 235 currently stores events awaiting processing (e.g., events moved from the display server queue to the client queue in the NhPending call) then the next event in the client queue is retrieved in step 911. In step 913, XNextEvent determines whether an event handler is registered for the event retrieved from the client queue 235. If an event handler is registered then it is invoked in step 915.

Figure 11:
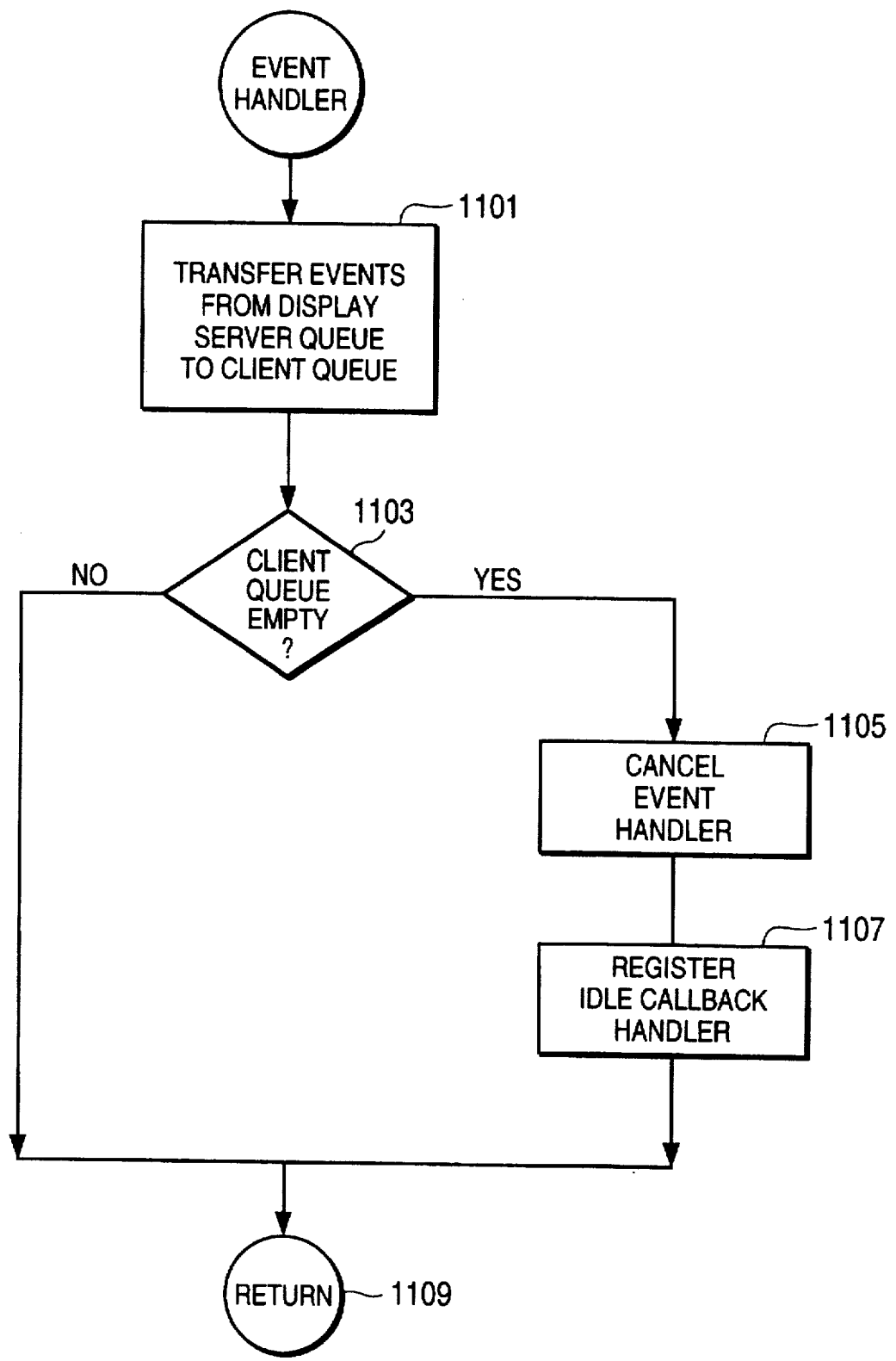
FIG. 11 is a flow diagram of a second embodiment of the event handler routine.

FIG. 11 is a flow diagram of a second embodiment of the event handler routine. In step 1101, the event handler transfers events from the display server queue 233 to the client queue 235. In step 1103, the event handler routine examines the client queue to determine whether any events awaiting processing are currently stored in the client queue. If the client queue currently stores events awaiting processing then the event handler routine returns, in step 1109, to XNextEvent, and the events are processed when XNextEvent returns to the event loop of FIG. 3.

However, if the client queue is empty then the event handler is cancelled in step 1105 because all the events have been removed from the client queue. In step 1107, an idle callback handler is registered. As will be discussed in more detail below, the idle callback handler is invoked after the idle callbacks pending in the system have been processed. The idle callback handler checks the client queue 235 to determine whether, in the course of processing the idle callbacks, events were created. If events were created then the idle callback handler re-registers the event handler so that the newly created events can be processed by the system before an acknowledgment is sent to the No hands driver 223.

After the idle callback handler is registered, the event handler routine returns, in step 1109, to XNextEvent, and the most recent event pulled from the client queue (in step 911) is processed when XNextEvent returns to the event loop of FIG. 3. Step 1009 is processed if the message from the No Hands driver creates an idle callback but does not create an event.

Figure 9:
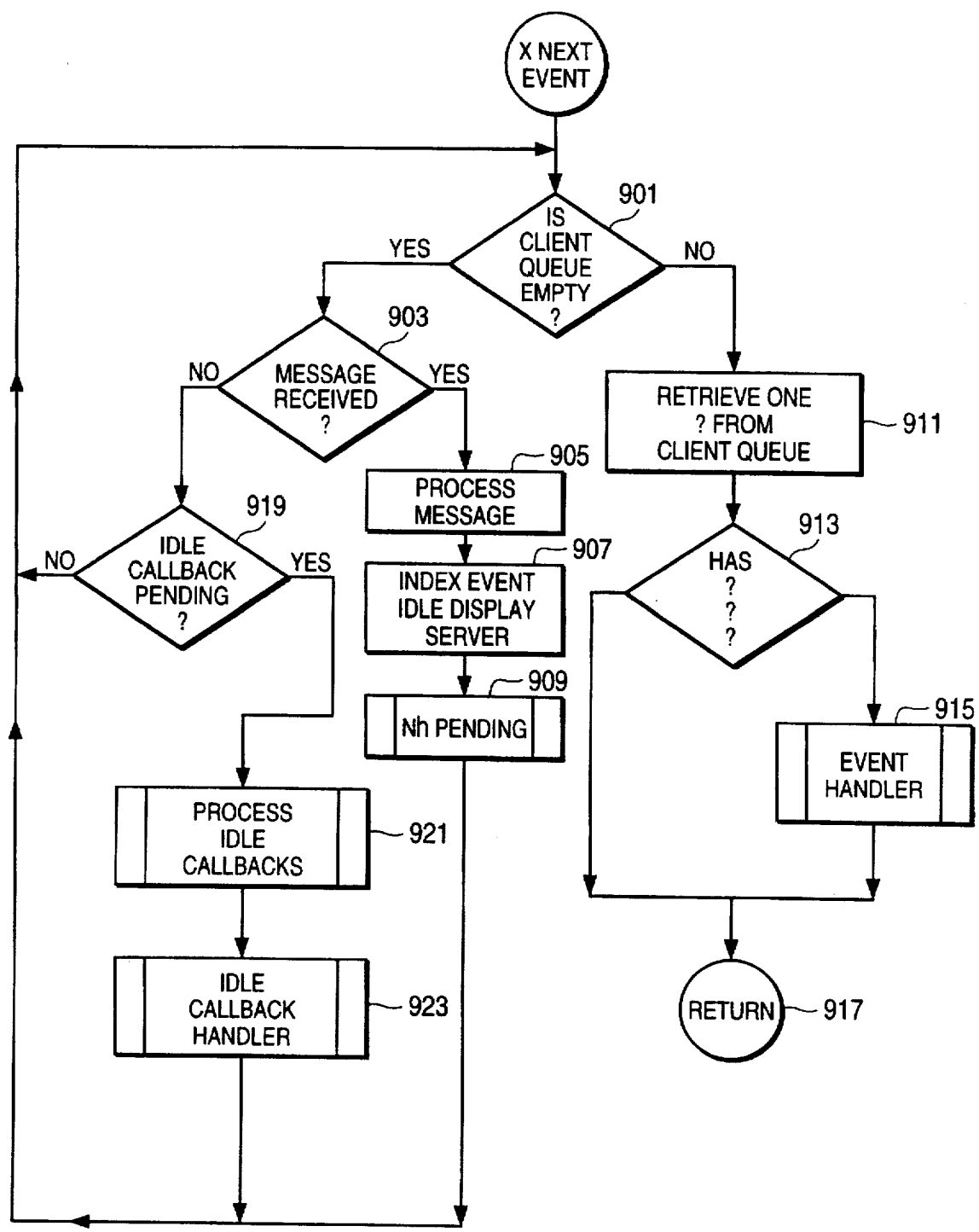
FIG. 9 is a flow diagram of a third embodiment of the XNextEvent routine.

The discussion of FIG. 9 has, to this point, illustrated the preferred steps to be taken if messages have been received from the No Hands driver 223 or if the client queue 235 currently stores events awaiting processing. Steps 919, 921, and 923 illustrate the preferred steps to be taken when all events from the client queue 235 have been processed and when XNextEvent no longer has messages from the No Hands driver to process. In step 919, XNextEvent examines the idle callback queue 243 to determine whether any idle callbacks await processing. At least the idle callback handler will be pending the first time through this part of the routine because it was previously registered by the event handler. When idle callbacks are pending, a process idle callbacks routine is invoked in step 921.

Figure 12:
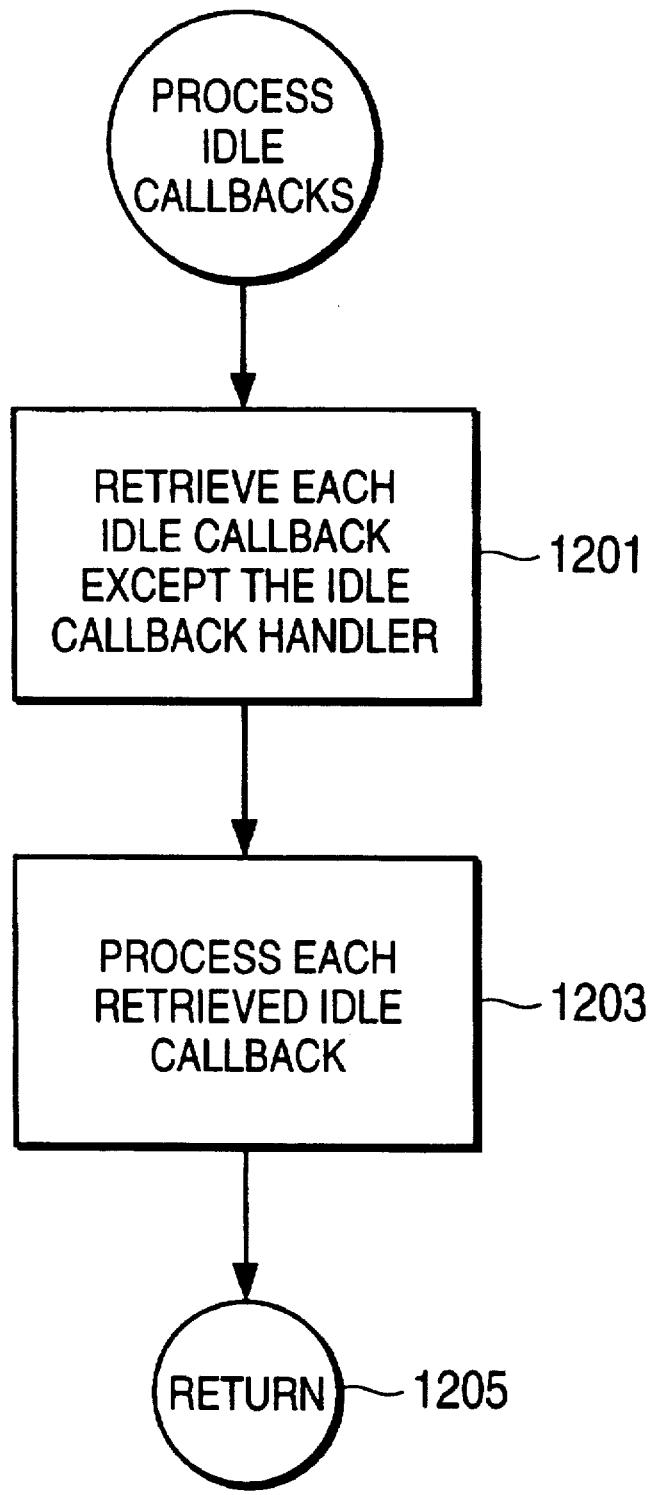
FIG. 12 is a flow diagram of the process idle callbacks routine.

FIG. 12 illustrates the preferred steps performed by the process idle callbacks routine. In step 1201 the routine retrieves each idle callback awaiting processing except the idle callback handler routine. In step 1203 each retrieved idle callback is processed. In this embodiment, each idle callback is processed at least once. Each idle callback is not necessarily processed to completion. After processing each retrieved idle callback, the process idle callbacks routine returns in step 1205 to XNextEvent.

Figure 13:
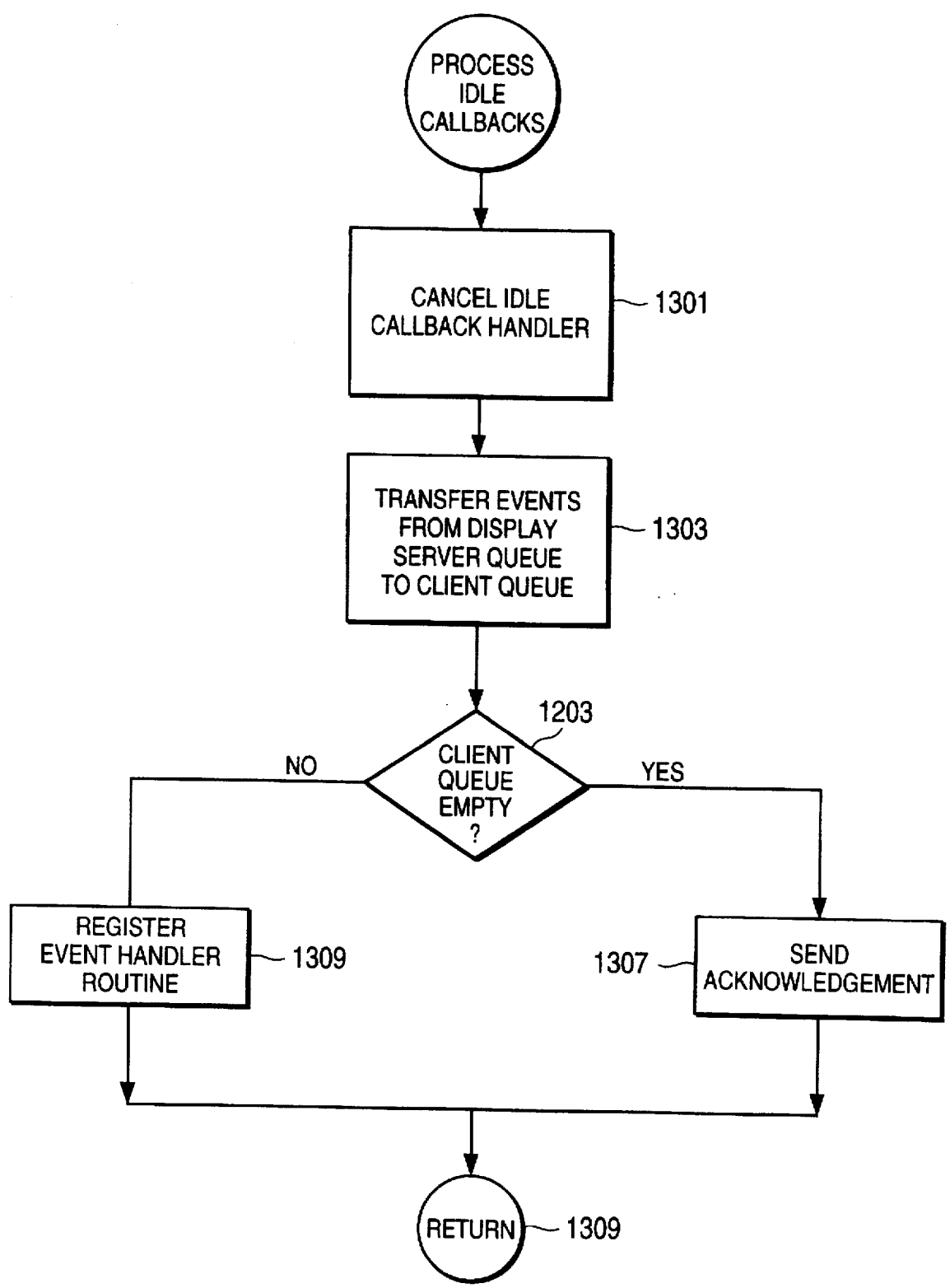
FIG. 13 is a flow diagram of the idle callback handler routine.

Upon return from the process idle callbacks routine, the idle callbacks handler is invoked in step 923. FIG. 13 is a flow diagram illustrating the preferred steps of the idle callback handler routine. In step 1301 the idle callback handler is cancelled because all the idle callbacks were previously retrieved and executed in the process idle callbacks routine (FIG. 12). Since the processing of the idle callbacks may have injected new events into the display server queue 233, the idle callbacks handler, in step 1303, flushes events from the display server queue 233 to the client queue 235. The idle callbacks handler then examines the client queue 235 to determine if the queue currently stores events awaiting processing. If the client queue does not store events awaiting processing, then an acknowledgment is sent to the No Hands driver 223. The acknowledgment indicates that the GUI program 217 is ready to process a new message from the No Hands driver because all events spawned from the previous message from the No Hands driver, as well as all events spawned from processing idle callbacks, have completed processing. After sending the acknowledgment, the idle callbacks handler returns to XNextEvent, where XNextEvent will begin processing any new messages from the No Hands driver.

However, if the examination of the client queue in step 1305 indicates that new events were spawned while processing the idle callbacks then the event handler routine is re-registered in step 1311. When the idle callbacks handler returns in step 1309 to XNextEvent, the newly created events will be processed as discussed above.

Advantages of the Preferred Embodiments

The present invention provides a number of advantages over prior methods for synchronizing event handling. For example, the present can be used in conjunction with systems for benchmarking the performance of the software product. Also, the present invention allows test scripts to complete their processing more quickly than the test scripts would have finished if they had been executing in conjunction with methods in the prior art.

Limitations of the Preferred Embodiments

A problem arises with the second and third embodiments of XNextEvent when the last event stored in the client queue 235 spawns new events while being processed. In short, the second and third embodiments send an acknowledgment to the No Hands driver before processing the events spawned while processing the last event in the client queue.

The best solution known to the inventors of the present invention at the time of filing this patent application is to introduce a synchronization event into the event stream. This SyncEvent will never be seen by the client, because it is discarded by the interposed version of XNextEvent. By sending a SyncEvent, any events spawned during the processing of the last event will be processed before sending the acknowledgment.

Figure 14:
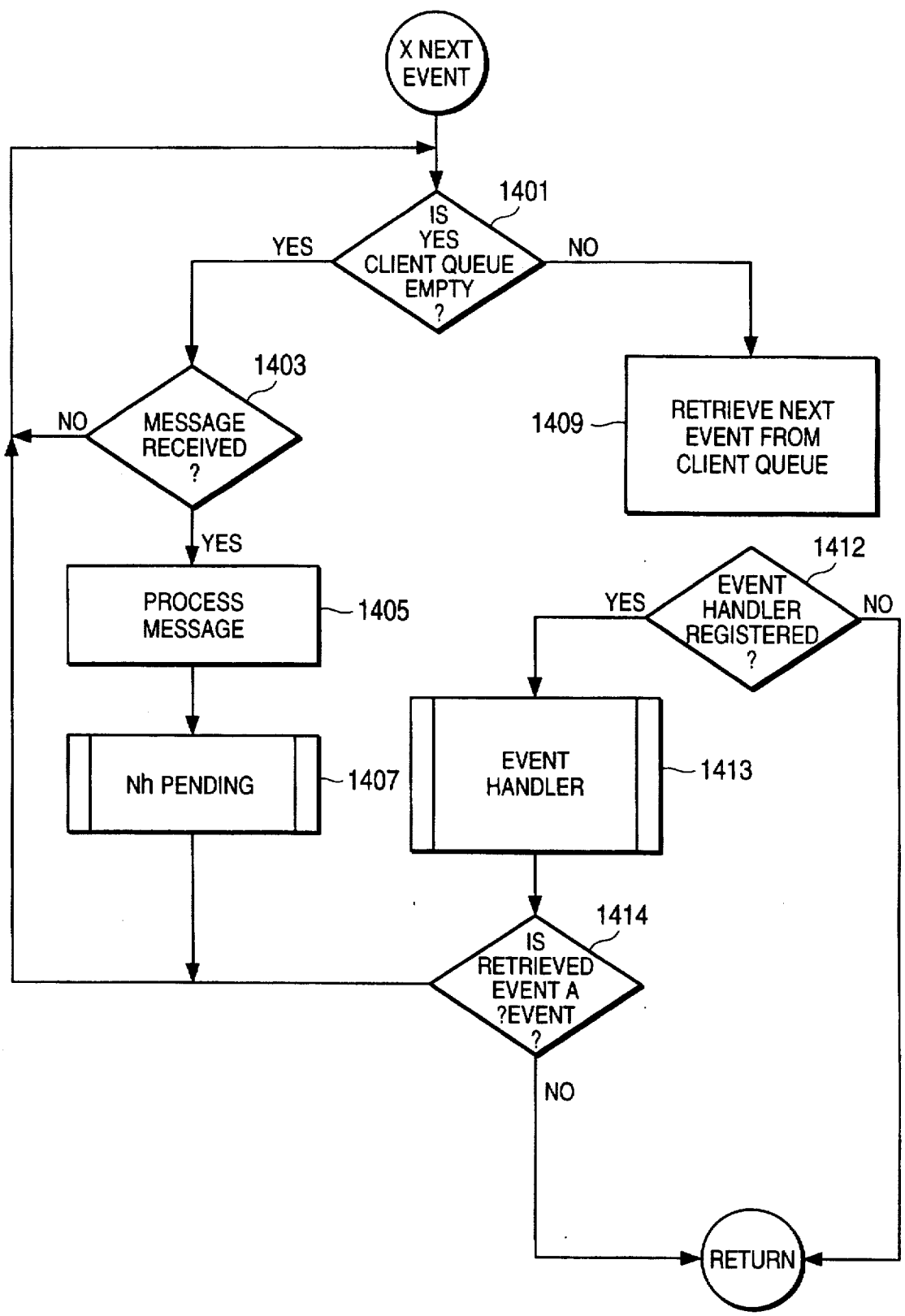
FIG. 14 is a flow diagram of a fourth embodiment of the XNextEvent routine.

FIG. 14 is a flow diagram of a fourth embodiment of the XNextEvent routine. FIG. 14 is similar to FIG. 6, except for the addition of step 1414. Step 1414 checks to see if the most recent event pulled from the client queue is a SyncEvent. If this is the case, then processing loops back to step 1401. The effect of this additional step is to prevent any SyncEvents from being processed by the client.

Figure 15:
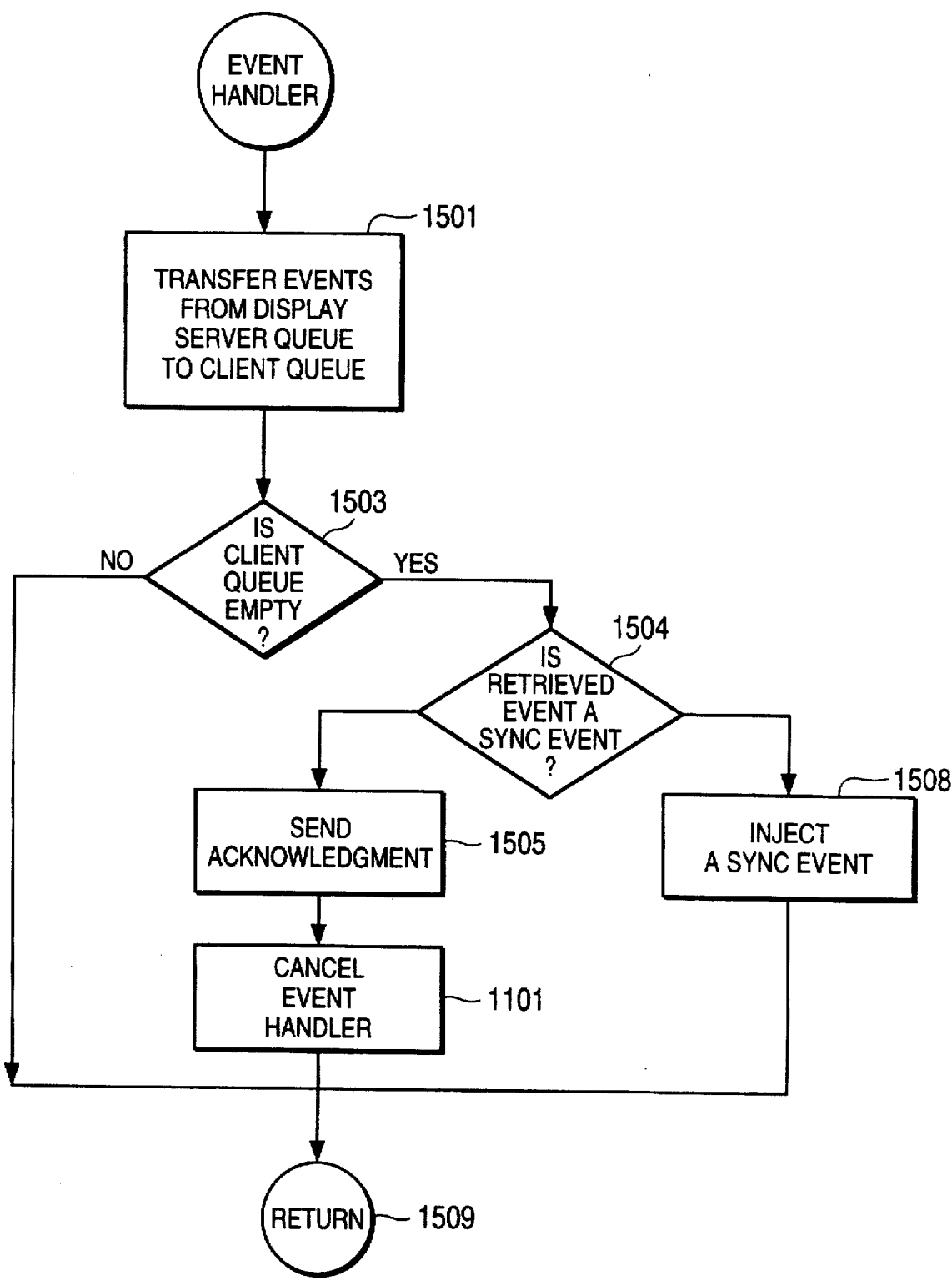
FIG. 15 shows a modified version of the Event Handler routine.

FIG. 15 shows a modified version of the Event Handler routine. In FIG. 8, if the client queue is empty, an acknowledgment is immediately sent to the driver. This has the limitation that any events spawned during the processing of the last event will not be processed before the acknowledgment is sent.

In FIG. 15, when there are no events left on the client queue 1503, a SyncEvent is generated in step 1508. This is different from FIG. 8 where an acknowledgment was sent at this point. During the following XNextEvent loop, the SyncEvent will be read from the queue and passed to the Event Handler. If no additional events were spawned during the processing step, then there will be no events (other than the SyncEvent) on the client queue 1503. When the Event Handler retrieves the SyncEvent 1504 from the client queue, an acknowledgment is sent to the driver 1505. If additional events were spawned during the processing, step 1503 will indicate that there are additional events (other than the SyncEvent) on the client queue. No acknowledgment will be sent until these additional events have been processed.

Modifications

It will be appreciated that, although four embodiments have been described herein for purposes of illustration, various modifications may be made without departing from the spirit and scope of the invention. For example, while the embodiments above discuss overloading the XNextEvent routine from the X Window System, those of ordinary skill will understand that other routines within the X Windows system can also be overloaded to achieve the results of the present invention. For example, the following routines may instead be overloaded: QLength, XAllowEvents, XCheckIfEvent, XCheckMaskEvent, XCheckTyped-Event, IfEvent, XCheckMaskEvent, XCheckTyped-Event, XCheckTypedWindowEvent, XCheckWindowEvent, XEventsQueued, XGetInputFocus, XGetMotionEvents, XIfEvent, XMaskEvent, XPeekEvent, XPeekIfEvent, XPending, XPutBackEvent, XSelectInput, XSendEvent, XSetInputFocus, XSynchronize, XWindowEvent. Those of ordinary skill will also understand that routines in other window systems can also be overloaded using the teachings discussed above to accomplish the results of the present invention.

We claim:

1. A method capable of being executed on a computer system for synchronizing the execution of events generated while testing a software module having a graphical user interface (GUI) portion, the method comprising the steps of:

receiving a first event associated with the GUI portion of the software module being tested;

processing the first event associated with the GUI portion;

tracking at least one event spawned as a result of processing the first event and examining a buffer to determine if the buffer currently stores any events awaiting processing;

processing the at least one event spawned as a result of processing the first event; and upon completion of processing of events being tracked, obtaining a new event associated with the GUI portion and determining when all the events being tracked have been processed.

2. The method of claim 1 wherein the step of determining when all the events being tracked have been processed further includes the step of concluding that all events being tracked have been processed when the step of examining determines that the buffer does not currently store any events awaiting processing.

3. The method of claim 1 wherein the step of determining when all the events being tracked have been processed further includes the steps of:

flushing events awaiting processing into the buffer;

inspecting the buffer to determine whether the buffer currently stores events; and cancelling the event handler mechanism when the inspection determines that the buffer does not currently store events.

4. The method of claim 1 further comprising the steps of:

processing one or more idle callbacks; and tracking at least one event spawned by processing the one or more idle callbacks.

5. The method of claim 4 wherein the step of tracking further includes the step of examining a buffer to determine if any events are stored in the buffer, wherein the step of examining occurs after the idle callbacks have been processed.

6. The method of claim 1 further comprising the steps of:

processing one or more idle callbacks; and processing at least one event spawned by processing the one or more idle callbacks.

7. A computer system capable of synchronizing the execution of events generated while testing a software module having a graphical user interface (GUI) portion, the computer system comprising:

a first program mechanism configured to receive a first event associated with the GUI portion of the software module being tested;

a second program mechanism configured to process the first event associated with the GUI portion of the software module;

a third program mechanism configured to track at least one event spawned as a result of processing the first event and a sixth program mechanism configured to examine a buffer to determine if the buffer currently stores any events awaiting processing;

a fourth program mechanism configured to process at least one event spawned as a result of processing the first event; and a fifth program mechanism configured to obtain a new event associated with the GUI portion when the processing of the at least one event being tracked is completed and a seventh program mechanism configured to determine when all the events being tracked have been processed.

8. The system of claim 7 wherein the seventh program mechanism configured to determine when all the events being tracked have been processed further includes an eighth program mechanism configured to conclude that all events being tracked have been processed when the sixth program mechanism configured to examine the buffer determines that the buffer does not currently store any events awaiting processing.

9. The system of claim 7 wherein the seventh program mechanism configured to determine when all the events being tracked have been processed further includes mechanisms for:

flushing events awaiting processing into the buffer;

inspecting the buffer to determine whether the buffer currently stores events; and cancelling the event handler mechanism when the inspection determines that the buffer does not currently store events.

10. The system of claim 7 further comprising:

a ninth program mechanism for processing one or more idle callbacks; and a tenth program mechanism configured to track at least one event spawned by processing the one or more idle callbacks.

11. The system of claim 10 wherein the tenth program mechanism configured to track further includes an eleventh program mechanism configured to examine a buffer to determine if any events are stored in the buffer, wherein the eleventh program mechanism is initiated after the idle callbacks have been processed.

12. A method executable in a computer system for synchronizing the execution of events generated while testing of a software module, having a graphical user interface (GUI) portion, the method comprising:

providing a first program mechanism configured to receive a first event associated with the software module being tested;

providing a second program mechanism configured to process the first event associated with the software module;

providing a third program mechanism configured to track at least one event spawned as a result of processing the first event and providing a sixth program mechanism configured to examine a buffer to determine if the buffer currently stores any events awaiting processing;

providing a fourth program mechanism configured to process at least one event spawned by processing the first event; and providing a fifth program mechanism configured to obtain a new event associated with the GUI portion when the processing of the at least one event being tracked is completed and providing a seventh program mechanism configured to determine when all the events being tracked have been processed.

13. The method of claim 12 wherein the seventh program mechanism configured to determine when all the events being tracked have been processed further includes the step of providing an eighth program mechanism configured to conclude that all events being tracked have been processed when the sixth program mechanism configured to examine the buffer determines that the buffer does not currently store any events awaiting processing.

14. The method of claim 12 wherein the seventh program mechanism configured to determine when all the events being tracked have been processed further includes:

providing a mechanism configured to flush events awaiting processing into the buffer;

providing a mechanism configured inspecting the buffer to determine whether the buffer currently stores events; and providing a mechanism configured to cancel the event handler mechanism when the inspection determines that the buffer does not currently store events.

15. The method of claim 12 further comprising the steps of:

providing a ninth program mechanism configured to process one or more idle callbacks; and providing a tenth program mechanism configured to track at least one event spawned by processing the one or more idle callbacks.

16. The method of claim 15 wherein the tenth program mechanism configured to track further includes providing an eleventh program mechanism configured to examine a buffer to determine if any events are stored in the buffer, wherein the eleventh program mechanism is initiated after the idle callbacks have been processed.

17. A method using a computer for synchronizing execution of testing events, the computer comprising a graphical user interface (GUI), a processor and a memory storing a GUI program and a test engine, the processor configured to execute the GUI program and the test engine, the method comprising the steps of:

providing a testing event to a display server queue shared by the GUI program and the test engine and executing a synchronization routine in the test engine;

processing the testing event in the display server queue on the GUI and receiving results from the testing event processing as inputs into the GUI program;

tracking at least one further testing event spawned as a result of processing the testing event in the display server queue and examining the display server queue to determine if the display server queue currently stores any further testing events awaiting processing;

processing the at least one further testing event spawned as a result of processing the testing event; and upon completion of processing of the at least one further testing event, obtaining a new testing event associated with the GUI program and determining when all the testing events being tracked have been processed; and acknowledging completion of the processing of the testing event upon return of the execution of the synchronization routine.

18. A method according to claim 17, wherein the GUI program further comprises an event queue, the step of executing a synchronization routine further comprising the steps of:

transferring the provided testing event from the display server queue to the event queue; and invoking an event handler routine in the GUI program in response to the transferred testing event in the client queue, the step of processing the testing event further comprising processing the testing event with the event handler routine.

19. A method according to claim 17, further comprising the steps of:

generating further testing events in the GUI program;

providing the further testing events to the display server queue; and processing iteratively each further testing event in the display server queue on the GUI and receiving the results from each further testing event processing as inputs into the GUI program while further testing events remain in the display server queue.

20. A method according to claim 17, wherein the step of processing the testing event further comprises the step of simulating a user input action with the test engine on the GUI.

21. A method according to claim 17, wherein the test engine further comprises an interpreter, a driver program and a series of test script commands for invoking routines in the test engine simulating user action on the GUI, the step of communicating further comprising the steps of:

retrieving such a test script command from the test script stored with the test engine;

interpreting the test script command with the interpreter; and sending output from the interpreter for the test script command to the GUI program via the driver program.

22. A system according to claim 17, wherein the GUI program further comprises an event queue, the test engine further configured to transfer the provided testing event from the display server queue to the event queue and invoke an event handler routine in the GUI program in response to the transferred testing event in the client queue, the processor processing the testing event with the event handler routine.

23. A system according to claim 17, the GUI program further comprising:

a generator generating further testing events; and a channel providing the further testing events to the display server queue, the processor further processing iteratively each further testing event in the display server queue on the GUI and receiving the results from each further testing event processing as inputs into the GUI program while further testing events remain in the display server queue.

24. A system according to claim 17, wherein the test engine further comprises an interpreter, a driver program and a series of test script commands for invoking routines in the test engine simulating user action on the GUI, the test engine retrieving such a test script command from the test script stored with the test engine, the interpreter interpreting the test script command, and the driver program sending output from the interpreter for the test script command to the GUI program.

25. A system for synchronizing execution of testing events with a graphical user interface (GUI) program, the system comprising:

a graphical user interface (GUI);

a memory storing the GUI program and a test program;

the test engine providing such a testing event to a display server queue shared by the GUI program and the test engine and executing a synchronization routine;

a processor interconnected with the GUI and the memory and processing the testing event in the display server queue on the GUI;

the GUI program receiving results from the testing event processing as inputs;

a monitor monitoring the processing of the testing event;

the processor tracking at least one further testing event spawned as a result of processing the testing event in the display server queue, examining the display server queue to determine if the display server queue currently stores any further testing events awaiting processing, and processing the at least one further testing event spawned as a result of processing the testing event;

upon completion of processing of the at least one further testing event, the processor obtaining a new testing event associated with the GUI program and determining when all the testing events being tracked have been processed; and the test engine acknowledging completion of the processing of the testing event upon return of the execution of the synchronization routine in response to the monitor.

* * * * *